UNITED STATES PATENT OFFICE.

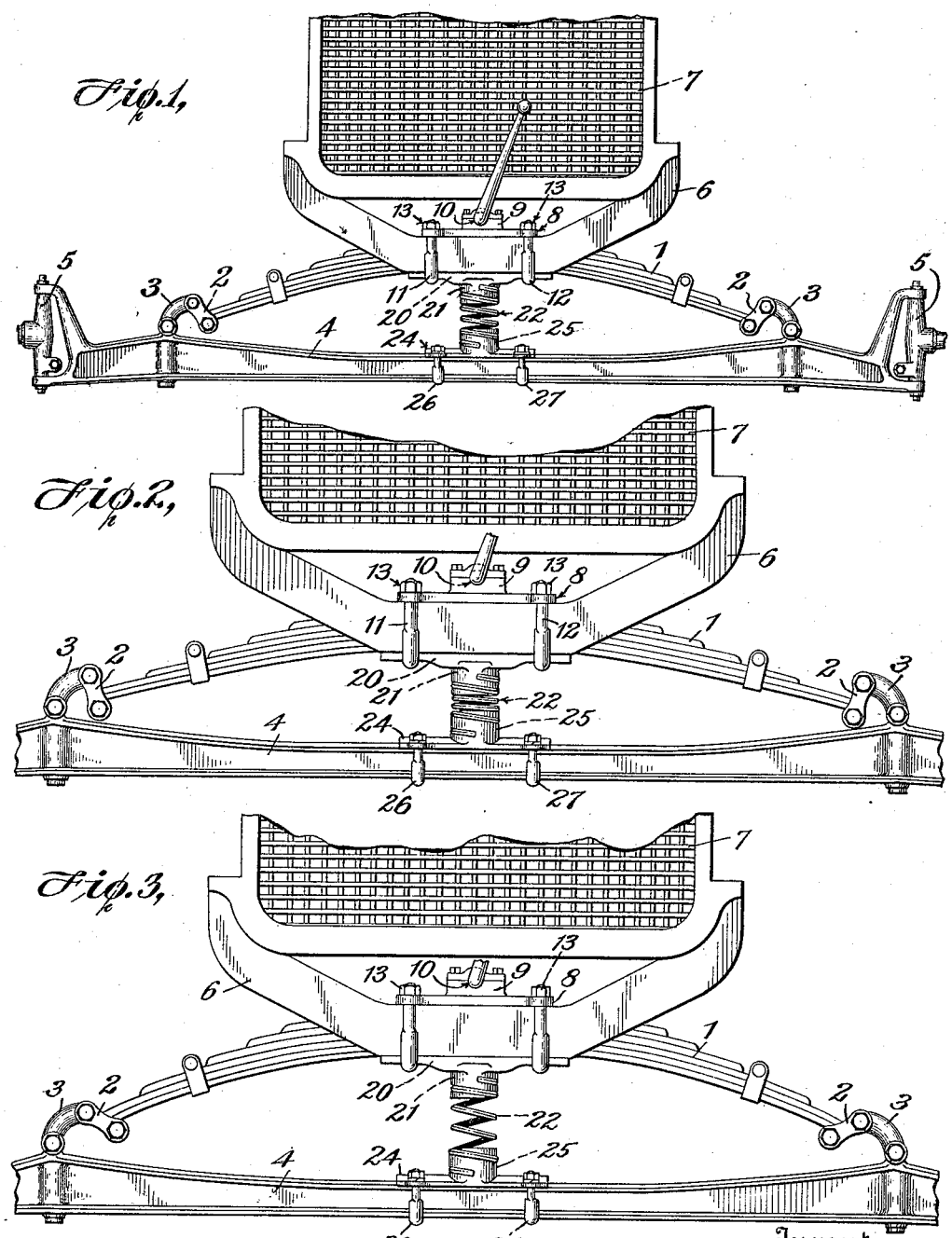

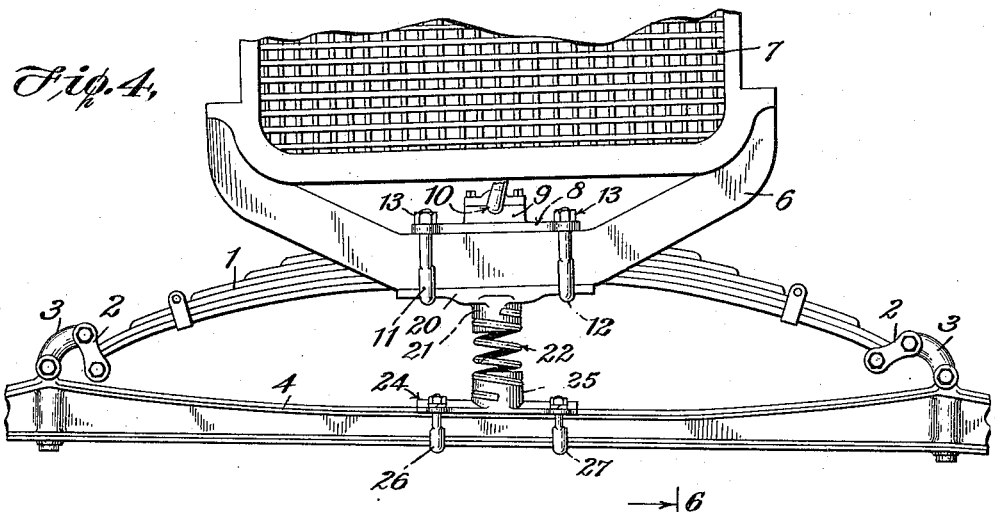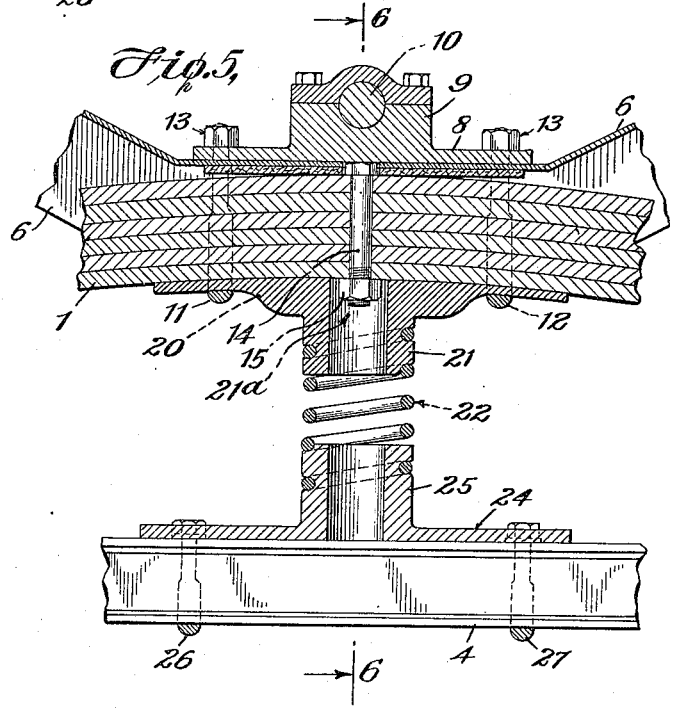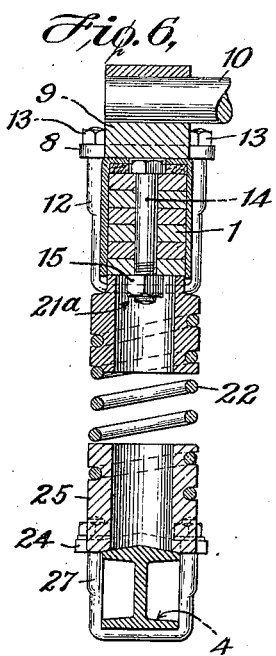

WILLIAM H. PLUNKETT, OF RICHMOND HILL, NEW YORK.

SHOCK-ABSORBER.

1,301,003.   Specification of Letters Patent.   Patented Apr. 15, 1919.

Application filed October 31, 1918. Serial No. 260,591.

*To all whom it may concern:*

Be it known that I, WILLIAM H. PLUNKETT, a citizen of the United States, residing at Richmond Hill, in the county of Queens and State of New York, have invented certain new and useful Improvements in Shock-Absorbers, of which the following is a full, clear, and exact description.

This invention relates to shock absorbers and more particularly to a device which will lesson the liability of breakage of the elliptic spring of an automobile.

One of the primary objects of the invention is to provide a device of this character which will not only absorb the strains and stresses to which an elliptic spring is subjected to upon a downward movement of the body of the automobile, but will also decrease the stresses and strains upon the spring upon the rebound. In other words, it is the object of the invention to provide a device which will not only serve as a shock absorber, but will also act as a snubber for the elliptic spring of an automobile.

Another object of the invention is to provide a device of this character, which consists of a few parts, and which may be attached to an automobile with practically no change in the existing construction. More particularly stated, it is a specific object of the invention to provide a device of this character which may be attached to the front spring of an automobile of the Ford type without requiring any changes in the existing construction of the front spring, and without requiring the services of a skilled mechanic to position it in place.

Other objects of the invention will be apparent from the description hereinafter to follow when taken in conjunction with the accompanying drawings, in which—

Figure 1 is a front elevation showing the device as it is applied to the front spring of a Ford automobile;

Fig. 2 is a similar view showing the position of the device when the elliptic spring is subjected to a downward load;

Fig. 3 is a similar view showing the device when the spring is subjected to an upward load, due to the rebound;

Fig. 4 is a similar view showing the action of the device when the elliptic spring moves sidewise on its shackles;

Fig. 5 is an enlarged detail showing the device in cross section; and

Fig. 6 is a similar view showing a section of Fig. 5 on the line 6—6 thereof.

As is well known, the front spring of a Ford automobile consists of a half elliptic spring, which is indicated 1, which is supported by shackles 2—2 at both ends, mounted upon brackets 3—3. These brackets are supported by the front axle 4 of the car, which carries at its ends the bearings 5—5 for the front wheels, not shown. The spring 1, which is a leaf spring of the usual type, carries the chassis of the car, a portion of which is shown and indicated 6, upon which is mounted the radiator 7. The portion 6 of the chassis, as will be clear from Fig. 6, consists of a channel-shaped piece into which the central portion of the spring is fitted.

Arranged above the portion 6 of the chassis is a plate 8 which carries a block 9, through which the crank shaft 10 of the starting handle passes. This plate 8 is normally secured to the part 6 by two U-shaped bolts 11 and 12, which pass through suitable holes in the plate and carry nuts 13 upon their threaded ends. These U-bolts not only serve to clamp the plate 8 to the part 6 but also act as the means for binding or securing the spring 1 within the channel-shaped piece 6. As will be clear from Fig. 6, the leaves of the springs are secured together by a king bolt 14 which carries a nut 15 at its lower end, normally projecting below the lower leaf of the spring, which bolt securely fastens the leaves of the spring together and with the U-bolts 11 and 12 which fasten the spring to the part 6, provides a durable construction which is in common use upon Ford cars. It has been found, however, that with a spring of this character secured in place as described, the stresses and strains to which the spring is subjected will in a great many instances cause a breakage of the spring not only due to the downward load upon the springs but also due to the strain caused by the rebound of the springs, the springs frequently breaking adjacent to the king bolt and between the two U-bolts which secure the spring to the part 6 of the chassis.

In order to avoid this breakage the device forming the present invention may be utilized. This device comprises a plate 20 carrying a boss 21 which is threaded to receive the end of a helical spring, as will be later referred to, which plate is provided with a central opening 21$^a$ and is normally, after assembly, secured to the under face of the central floating portion of the spring by the U-bolts 11 and 12, which have heretofore been used to confine the spring within the channel piece 6. To the boss 21 of this plate 20 is secured a helical spring 22, the pitch of the threads upon the boss 20 being such that it will fit the convolutions of the spring when in its normal or unstretched condition. Mounted upon the front axle 4 directly beneath the plate 20 is a second plate 24 which is also provided with a boss 25 threaded to receive the other end of the spring. This plate 24 fits directly upon the upper surface of the axle and is secured in place by U-bolts 26 and 27.

This device may be secured to the car without any necessity of attachments other than the ones described, in the following manner. The U-bolts 11 and 12 are first removed and the plate 20 positioned beneath the spring, after which the U-bolts are again placed in position and the nuts 13 tightened, which will securely clamp the plate 20 and boss 21 to the under side of the spring. It should be here noted that to do this the king bolt 14 need not be removed, since the opening 21 in the plate will permit this part to be attached, the nut of the king bolt fitting into the recess provided in this manner.

After this part has been attached as described, one end of the spring 22 is threaded onto the boss 21, the other part of the device, namely the plate 24 carrying the boss 25, is then threaded onto the other end of the spring and the plate 24 by compressing the spring 22, slightly, is forced into place upon the top surface of the axle. The U-bolts 26 are then secured in place, which clamps this plate 24 securely to the front axle 4.

The spring 22 is of a length such that when it is attached as described it will not be under any tension or compression when completely assembled, and when the elliptic spring 1 is also in unstressed condition.

Referring now to Figs. 2, 3 and 4, the action of the device under different conditions is made clear.

In Fig. 2 the elliptic spring 1 is shown as it spreads when the downward load is placed upon the spring. Under this condition the spring 22 will be compressed, and since it is a helical spring the amount of compression will increase proportionately to the downward load upon the spring; or in other words, where the spring 1 is only subjected to a slight downward movement the compression of the spring 22 will not be great and the spring 1 will function practically as under normal conditions. When, however, the downward movement becomes greater the compression of the spring 22 increases proportionately so that upon relatively large downward movements this spring will bear the brunt of the downward load and in this manner give relief to the elliptic spring from the load which it would otherwise have to carry.

Upon the rebound the spring moves upwardly to a position shown in Fig. 3, and here again since the spring 22 is normally unstressed when the spring 1 occupies its normal position a slight upward movement of the spring 1 above its normal position will not cause a heavy tension to be placed upon the spring 22, but if the rebound is violent, as is frequently the case, the tension exerted by the spring 22 will correspondingly increase and again take the brunt of the load, which will prevent a breaking of the elliptic spring, as frequently occurs when it is subjected to these violent strains created by the rebound of the body of the car.

In Fig. 4 the spring 1 is shown in the position that it assumes when there is a side sway to the body of the car, and here again the spring 22 will quickly snub or absorb this side sway since this spring 22 will be placed under tension as shown in Fig. 4.

It is to be noted that the helical spring engages for a major part of its length the threads upon the bosses. By reason of this construction a rigid connection between the spring and the bosses is obtained which will securely and rigidly anchor the spring to the bosses. Furthermore, the number of free convolutions of the spring between the bosses are comparatively few and the cross section of the spring relatively large. It is therefore evident that helical spring will be quickly placed under tension or compression to absorb or snub the movement of the elliptic spring as above described.

While the device has been described and is primarily intended for use with an elliptic spring of the type shown, it is obvious that the device by slight modifications may be utilized with elliptic springs of a different character and yet perform the same function and it is intended that such constructions will come within the purview of this invention as set forth in the appended claim.

I claim:

In combination with an elliptic spring having a floating middle point, and its support, a boss rigidly secured to said spring at its middle point, a boss rigidly secured to the support, said bosses being in axial alinement and threaded and a helical spring having its end convolutions engaging the threads upon said bosses for a major part of the length of the spring, the number of free convolutions between the bosses being comparatively few and the cross section of the spring being proportionally large to absorb or snub the relative longitudinal and transverse movement of the bosses.

WILLIAM H. PLUNKETT.

Copies of this patent may be obtained for five cents each, by addressing the "Commissioner of Patents, Washington, D. C."